(12) United States Patent
Park et al.

(10) Patent No.: US 11,512,252 B2
(45) Date of Patent: *Nov. 29, 2022

(54) SEMICONDUCTOR NANOCRYSTAL PARTICLES AND DEVICES INCLUDING THE SAME

(71) Applicant: SAMSUNG ELECTRONICS CO., LTD., Suwon-si (KR)

(72) Inventors: Garam Park, Seoul (KR); Eun Joo Jang, Suwon-si (KR); Yongwook Kim, Suwon-si (KR); Jihyun Min, Seoul (KR); Hyo Sook Jang, Suwon-si (KR); Shin Ae Jun, Seongnam-si (KR); Taekhoon Kim, Hwaseong-si (KR); Yuho Won, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 528 days.

This patent is subject to a terminal disclaimer.

(21) Appl. No.: 15/251,643

(22) Filed: Aug. 30, 2016

(65) Prior Publication Data
US 2017/0088775 A1 Mar. 30, 2017

(30) Foreign Application Priority Data
Sep. 24, 2015 (KR) .................. 10-2015-0135885

(51) Int. Cl.
*C09K 11/88* (2006.01)
*C09K 11/02* (2006.01)
(Continued)

(52) U.S. Cl.
CPC ............ *C09K 11/883* (2013.01); *C09K 11/70* (2013.01); *B82Y 20/00* (2013.01); *Y10S 977/774* (2013.01); *Y10S 977/95* (2013.01)

(58) Field of Classification Search
CPC ... C09K 11/883; C09K 11/025; C09K 11/565; C09K 11/70; C09K 11/703; C09K 11/02;
(Continued)

(56) References Cited

U.S. PATENT DOCUMENTS 6,855,202 B2  2/2005  Alivisatos et al.
7,960,715 B2  6/2011  Pryor et al.
(Continued)

FOREIGN PATENT DOCUMENTS

KR  1020070121380 A  12/2007
KR  1020140121351 A  10/2014
WO     2011-140668 A1  11/2011

OTHER PUBLICATIONS

Dmitri V. Talapin et al. "Seeded Growth of Highly Luminescent CdSe/CdS Nanoheterostructures with Rod and Tetrapod Morphologies", NANO Letters, 2007, vol. 7, No. 10, pp. 2951-2959.
(Continued)

*Primary Examiner* — Matthew E. Hoban
*Assistant Examiner* — Lynne Edmondson
(74) *Attorney, Agent, or Firm* — Cantor Colburn LLP

(57) ABSTRACT

A semiconductor nanocrystal particle including: a core including a first semiconductor material; and a shell disposed on the core, wherein the shell includes a second semiconductor material, wherein the shell is free of cadmium, wherein the shell has at least two branches and at least one valley portion connecting the at least two branches, and wherein the first semiconductor material is different from the second semiconductor material.

15 Claims, 16 Drawing Sheets
(6 of 16 Drawing Sheet(s) Filed in Color)

(51) Int. Cl.
  *C09K 11/70* (2006.01)
  *H01L 33/50* (2010.01)
  *B82Y 20/00* (2011.01)
(58) Field of Classification Search
  CPC ... C09K 11/08; C09K 11/623; C09K 11/7492; C08K 3/30; C08K 3/32; H01L 33/502; H01L 33/504; C01B 19/007; C01B 19/00; B82Y 20/00; Y10S 977/774; Y10S 977/824
  USPC ............... 252/301.36, 301.6 S; 257/42, 614
  See application file for complete search history.

(56) References Cited

U.S. PATENT DOCUMENTS

| | | | |
|---|---|---|---|
| 8,501,595 | B2 | 8/2013 | Jang et al. |
| 9,698,311 | B2 | 7/2017 | Greco et al. |
| 10,723,942 | B2* | 7/2020 | Jun .................. C08K 3/30 |
| 2010/0289003 | A1* | 11/2010 | Kahen .................. C09K 11/883 257/14 |
| 2011/0056564 | A1 | 3/2011 | Korgel et al. |
| 2012/0175585 | A1 | 7/2012 | Banin et al. |
| 2012/0301510 | A1 | 11/2012 | Kishimoto et al. |
| 2013/0112940 | A1 | 5/2013 | Kurtin et al. |
| 2013/0115455 | A1* | 5/2013 | Banin .................. C09K 11/7492 428/375 |
| 2014/0170383 | A1 | 6/2014 | Miszta et al. |

OTHER PUBLICATIONS

Doh C. Lee et al. "Infrared-Active Heterostructured Nanocrystals with Ultralong Carrier Lifetimes", J. Am. Chem. Soc. 2010, 132, 9960-9962.

Eunseog Cho et al. "Modeling on the size dependent properties of InP quantum dots: a hybrid functional study", Nanotechnology 2013, 24, 215201 (5 pp.).

Jaehoon Lim et al. "Highly Efficient Cadmium-Free Quantum Dot Light-Emitting Diodes Enabled by the Direct Formation of Excitons within InP@ZnSe$_s$ Quantum Dots", ACS Nano, 2013, vol. 7, No. 10, pp. 9019-9026.

Patrick T. K. Chin, et al. "Highly Luminescent CdTe/CdSe Colloidal Heteronanocrystals with Termperature-Dependent Emission Color", J. Am. Chem. Soc. 2007, 129, 14880-14886.

Peter Reiss et al. "Core/Shell Semiconductor Nanocrystals", Small, 2009, vol. 5, No. 2, pp. 154-168.

Renguo Xie et al. "Design and Synthesis of Colloidal Nanocrystal Heterostructures with Tetrapod Morphology", Small 2006, vol. 2, No. 12, pp. 1454-1457.

English Translation of Office Action dated Feb. 12, 2022, of the corresponding Korean Patent Application No. 10-2015-0135885, 6 pp.

Office Action dated Feb. 12, 2022, of the corresponding Korean Patent Application No. 10-2015-0135885, 5 pp.

* cited by examiner

SEMICONDUCTOR NANOCRYSTAL PARTICLES AND DEVICES INCLUDING THE SAME

CROSS-REFERENCE TO RELATED APPLICATION

This application claims priority to Korean Patent Application No. 10-2015-0135885 filed in the Korean Intellectual Property Office on Sep. 24, 2015, and all the benefits accruing therefrom under 35 U.S.C. § 119, the content of which is incorporated herein in its entirety by reference.

JOINT RESEARCH AGREEMENT

The inventions described and claimed herein were made pursuant to a Joint Research Agreement, in effect on or before the date the inventions were made, between Samsung Electronics Co., Ltd., Samsung Display Co., Ltd., and Samsung SDI Co., Ltd.

BACKGROUND

1. Field

Semiconductor nanocrystal particles and devices including the same are disclosed.

2. Description of the Related Art

Nanoparticles have attracted much attention due to the fact that unlike bulk materials, the desired physical characteristics of the nanoparticles (e.g., energy bandgaps and melting points) may be attained by changing their particle sizes. For example, semiconductor nanocrystals, also known as quantum dots, are semiconductor materials having a crystal structure of a size of several nanometers. Because of the small size, the semiconductor nanocrystals have a large surface area per unit volume. In addition, they exhibit quantum confinement effects, and thus have different physico-chemical characteristics in comparison with the bulk material. Quantum dots may absorb light from an excitation source to reach the excited state, and may emit energy corresponding to their energy bandgaps. In the quantum dots, the energy bandgaps may be adjusted by varying the size and/or the composition of the nanocrystal, and the quantum dots have light emitting properties of high color purity. Therefore, research has been conducted on various applications of the semiconductor nanocrystals to a display device, an energy device, a bio-light emitting device, or the like.

The semiconductor nanocrystals (i.e., quantum dots) may be synthesized by a vapor deposition method such as metal organic chemical vapor deposition (MOCVD) and molecular beam epitaxy (MBE), or by a wet chemical method of adding a precursor to an organic solvent to grow crystals. In the wet chemical method, the semiconductor crystal is coordinated to an organic material such as an organic solvent and the like, which is present on its surface during the crystal growth, and thereby the organic material plays a role of a dispersing agent controlling the crystal growth. Therefore, the nanocrystal may have a more uniform size and shape, and the semiconductor nanocrystal particles having a core-shell structure may be relatively easily synthesized by the wet chemical method than by the vapor deposition method.

The semiconductor nanocrystal particle having the core-shell structure is known to have the slightly increased luminous efficiency, but most of them include cadmium. As cadmium an element that may pose serious environmental and health issues, it is desirable to provide a cadmium-free semiconductor nanocrystal particle with excellent light emitting properties.

SUMMARY

An embodiment relates to a cadmium-free semiconductor nanocrystal particle having improved light emitting properties, such as high quantum efficiency.

Another embodiment provides an electronic device including the semiconductor nanocrystal particle.

In an embodiment, a semiconductor nanocrystal particle includes:

a core including a first semiconductor material; and a shell disposed on the core, wherein the shell includes a second semiconductor material, wherein the shell is free of cadmium, wherein the shell has at least two branches and at least one valley portion connecting the at least two branches, and wherein the first semiconductor material is different from the second semiconductor material.

The shell may surround the entire surface of the core.

The shell may have at least three branches.

A thickness of the shell may be greater than or equal to about 1 nanometer.

In the semiconductor nanocrystal particle, a depth of the at least one valley portion may be greater than about 0.

A composition of the branch may have a function of its length.

The core and the shell may have the same crystal structure at the interface therebetween.

The crystal structure may be a zinc blend or wurtzeit.

The first semiconductor material may include a Group II-VI compound, a Group III-V compound, a Group IV-VI compound, a Group IV element or compound, a Group I-III-VI compound, a Group II-III-VI compound, a Group I-II-IV-IV compound, or a combination thereof.

The second semiconductor material may include a Group II-VI compound, a Group III-V compound, a Group IV-VI compound, a Group IV element or compound, a Group I-III-VI compound, a Group II-III-VI compound, a Group I-II-IV-IV compound, or a combination thereof.

The Group II-VI compound may be selected from:

a binary compound selected from ZnS, ZnSe, ZnTe, ZnO, HgS, HgSe, HgTe, MgSe, MgS, and a combination thereof;

a ternary compound selected from ZnSeS, ZnSeTe, ZnSTe, HgSeS, HgSeTe, HgSTe, CdZnS, HgZnS, HgZnSe, HgZnTe, MgZnSe, MgZnS, and a combination thereof; and a quaternary compound selected from HgZnTeS, HgZnSeS, HgZnSeTe, HgZnSTe, and a combination thereof.

The Group III-V compound may be selected from:

a binary compound selected from GaN, GaP, GaAs, GaSb, AlN, AlP, AlAs, AlSb, InN, InP, InAs, InSb, and a combination thereof;

a ternary compound selected from GaNP, GaNAs, GaNSb, GaPAs, GaPSb, AlNP, AlNAs, AlNSb, AlPAs, AlPSb, InNP, InNAs, InNSb, InPAs, InPSb, and a combination thereof; and a quaternary compound selected from GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The Group IV-VI compound may be selected from:

a binary compound selected from SnS, SnSe, SnTe, PbS, PbSe, PbTe, and a combination thereof;

a ternary compound selected from SnSeS, SnSeTe, Snالسلام, PbSeS, PbSeTe, PbSTe, SnPbS, SnPbSe, SnPbTe, and a combination thereof; and a quaternary compound selected from SnPbSSe, SnPbSeTe, SnPbSTe, and a combination thereof.

The Group I-III-VI compound may be selected from $CuInSe_2$, $CuInS_2$, CuInGaSe, and CuInGaS.

The Group I-II-IV-IV compound may be selected from CuZnSnSe and CuZnSnS.

The Group II-III-VI compound may be selected from ZnGaS, ZnAlS, ZnInS, ZnGaSe, ZnAlSe, ZnInSe, ZnGaTe, ZnAlTe, ZnInTe, ZnGaO, ZnAlO, ZnInO, HgGaS, HgAlS, HgInS, HgGaSe, HgAlSe, HgInSe, HgGaTe, HgAlTe, HgInTe, MgGaS, MgAlS, MgInS, MgGaSe, MgAlSe, and MgInSe.

The Group IV element or compound may be selected from a singular element material selected from Si, Ge, and a combination thereof; and a binary compound selected from SiC, SiGe, and a combination thereof.

The core may include a Group III-V compound and the shell may include a Group II-VI compound.

The core may include indium, and the shell may include at least three elements.

The core may further include Zn.

The semiconductor nanocrystal particle may have quantum efficiency of greater than or equal to about 75%.

The semiconductor nanocrystal particle may have two or more cores.

In another embodiment, an electronic device including the semiconductor nanocrystal particle is provided.

The electronic device may be a light emitting diode (LED), an organic light emitting diode (OLED), a sensor, an imaging sensor, or a solar cell electronic device, or a liquid crystal display (LCD) device.

Cadmium-free semiconductor nanocrystals with improved luminous properties may be provided. The semiconductor nanocrystals thus provided may find their utilities in various display devices, biological labeling (e.g., a biosensor, a bio-imaging, and the like), photo-detectors, solar cells, hybrid composites, and the like.

BRIEF DESCRIPTION OF THE DRAWINGS

The present patent application contains at least one drawing executed in color. Copies of this patent application with color drawing(s) will be provided by the Office upon request and payment of the necessary fee.

The above and other advantages and features of this disclosure will become more apparent by describing exemplary embodiments thereof in further detail with reference to the accompanying drawings, in which.

DETAILED DESCRIPTION

Figure 1A:
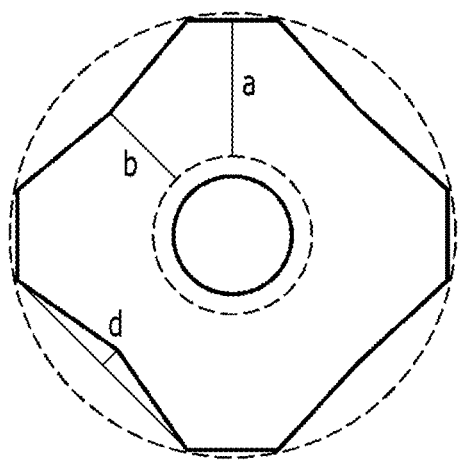
FIG. 1A is a schematic view showing a shape of a semiconductor nanocrystal particle according to an embodiment.

This disclosure will be described more fully hereinafter in the following detailed description, in which some, but not all embodiments of this disclosure are described with reference to the attached drawings. This disclosure may be embodied in many different forms and is not be construed as limited to the embodiments set forth herein. Unless otherwise defined, all terms used in the specification (including technical and scientific terms) may be used with meanings commonly understood by a person having ordinary knowledge in the art. Further, unless explicitly defined to the contrary, the terms defined in a generally-used dictionary are not ideally or excessively interpreted. In addition, unless explicitly described to the contrary, the word "comprise" and variations such as "comprises" or "comprising", will be understood to imply the inclusion of stated elements but not the exclusion of any other elements.

Unless specifically described to the contrary, a singular form includes a plural form.

Exemplary embodiments are described herein with reference to illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

In the drawings, the thickness of layers, regions, etc., are exaggerated for clarity. Like reference numerals designate like elements throughout the specification.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise. Unless specified otherwise, the term "or" means "and/or." As used herein, the term "and/or" includes any and all combinations of one or more of the associated items. Expressions such as "at least one of," when preceding a list of elements, modify the entire list of elements and do not modify the individual elements of the list.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, the term "combination thereof" refers to a mixture, a stacked structure, a composite, an alloy, a blend, a reaction product, or the like.

As used herein, the term "alkyl group" may refer to a straight or branched chain saturated aliphatic hydrocarbon group having the specified number of carbon atoms and having a valence of at least one.

A semiconductor nanocrystal particle according to an embodiment includes:

a core including a first semiconductor material; and a shell disposed on the core, wherein the shell includes a second semiconductor material, and wherein the shell is free of cadmium.

The shell has at least two branches and at least one valley portion connecting the at least two branches, and the first semiconductor material is different from the second semiconductor material. According to an embodiment, a column-shaped nanorod (i.e., the case where cross-sectional surface of two branches forms a straight line) is excluded from the particle.

When the nanocrystal particles include semiconductor material (hereinafter, referred to semiconductor nanocrystal particles), the energy bandgap may be controlled by varying the nanoparticle size and composition, and the nanocrystal particles may have light emitting properties with a high color purity. Therefore, the semiconductor nanocrystal particles attracted significant attention as a material that may be applicable to the various fields such as a display, energy, a semiconductor, and bio. However, currently, most of the semiconductor nanocrystals having satisfactory properties include cadmium (Cd). As cadmium is one of the elements posing serious health and environmental threats, it is desirable to develop a cadmium-free semiconductor nanocrystal having improved light emitting properties. Group III-V compound semiconductor nanocrystals may be classified into a cadmium-free semiconductor nanocrystal, but the precursor used in their synthesis process is sensitive to oxidation and its activity tends to be poor in comparison with the cadmium-containing semiconductor nanocrystal (e.g., CdSe quantum dots), which makes the control of the synthetic reaction difficult. As Group III-V semiconductor nanocrystal, InP/ZnS core-shell semiconductor nanocrystals are one of the most researched quantum dots. However, the InP semiconductor nanocrystal has a lower level of light emitting properties than those of the conventional Cd quantum dot. Given that a required particle size is 2-5 nm, the synthesis of such a semiconductor nanocrystal is not easy.

On the contrary, the semiconductor nanocrystal particle according to an embodiment has the aforementioned structure (i.e., including at least two branches and at least one valley portion connecting the at least two branches). The semiconductor nanocrystal particle does not include cadmium, and thereby may show improved luminous efficiency.

A shell may effectively provide passivation for a surface of a core in the core-sell semiconductor nanocrystal particle to increase the luminous efficiency and to enhance the stability of the particle. For example, as the shell grows, the optical properties (e.g., light emitting wavelength, luminous efficiency, life-span or the like) of the core may be changed. The shell may act as a physical barrier to ensure the stability of the core, which is susceptible to the surrounding atmosphere. Furthermore, the shell provides passivation for the trap of the core surface, which promotes the enhancement in the luminous efficiency.

While the cadmium core-shell semiconductor nanocrystal may provide a high luminous efficiency, it is still difficult for the cadmium-free core-shell semiconductor nanocrystal to provide improved luminous efficiency as explained above. In the case of the Cd-free (e.g., indium) semiconductor nanocrystal, the core is passivated by a thin shell, generally, having a thickness of less than about 1 nanometer (nm). However, in the case of the indium core-shell semiconductor nanocrystal particles, such a thickness of the shell may be insufficient to passivate the core, thus the luminous efficiency and the stability thereof are inferior to the cadmium semiconductor nanocrystal.

Meanwhile, when the shell having the composition different from the core is grown to have a predetermined thickness (e.g., greater than or equal to about 1 nm), a branch may begin to be formed on a surface having a high surface energy in such a direction that lattice strain decreases. Thus, once the shell has a thickness of greater than or equal to a predetermined level, spherical growth does not occur. In addition, the factors such as the lattice mismatch between the core and the shell, the crystalline face mismatch between the core and the shell, and the strain in a large curvature radius may preclude the spherical growth of the shell. In this case, it may be difficult for the core surface to obtain sufficient passivation, in particular at its face other than that of a branch growing direction. This phenomenon may become more problematic for core-shell structured nanocrystals wherein the crystallographic surface of the core is different from that of the shell at the interface therebetween. For example, when a wurtzeit branch is growing on the core surface having a zinc blend structure, it is difficult to provide a valley portion connecting the branches, and the core face present between branches may be insufficiently passivated.

In the case where the shell thickness increases under such circumstances, the light emitting properties such as a quantum efficiency of the semiconductor nanocrystal particle may decrease despite the increased shell thickness. Even when the spherical growth of the shell occurs, the indium semiconductor nanocrystal particle may have lower efficiency once the thickness of the shell reaches a predetermined value (e.g., of greater than or equal to about 1 nm).

On the contrary, in the semiconductor nanocrystal particle according to an embodiment, the shell includes at least 2 (e.g., 3, 4, 5, 6, 7, or even 8 or more) branches and a valley portion connecting the branches as well.

In the semiconductor nanocrystal particle according to an embodiment, the branches (i.e., anisotropic or unsymmetrical structure) are formed due to the increased level of lattice mismatch between the core and the shell and the increased differences of the surface energies therebetween when the shell grows to have a predetermined thickness (e.g., greater than or equal to 3 mono layer, greater than or equal to 4 monolayer, or greater than or equal to about 1 nm). But at the same time, a portion of the shell between the branches (i.e., the valley portion) may also grow to connect the branches. This makes it possible for the shell to effectively cover the surface of the core. Without wishing to be bound by any theory, when the core and the shell have the same crystalline structure (e.g., zinc blend or wurtzeit) and the composition of the shell is varied to adjust the lattice mismatch at the interface between the core and the shell, the valley portion may grow together with the branch. For example, it is believed that the valley portion may grow together with the branch when the shell composition is adjusted in order to decrease the lattice mismatch at the interface of the core and the shell at the time when the branch is formed, and thereafter to control (e.g., increase) the lattice mismatch, if desired.

Thus, in the semiconductor nanocrystal particle according to an embodiment, the shell may surround the entire surface of the core. The structure is described in detail, with reference to FIG. 1A and FIG. 1B, showing a structure according to a non-limiting embodiment.

As shown in FIG. 1A, the semiconductor nanocrystal particle according to the non-limiting embodiment includes a core; and four (4) branches and a valley portion connecting the branches. Although the core has a spherical shape in FIG. 1A, the core may have any shape in another embodiment. For example, the core may be a tetrahedron, a truncated tetrahedron, an octahedron, a truncated octahedron, or a polyhedron.

Figure 1B:
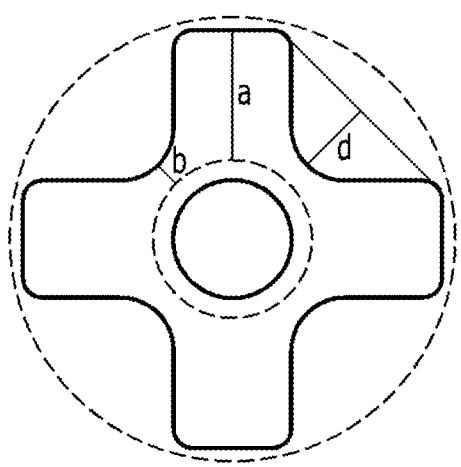
FIG. 1B is a schematic view showing a shape of a semiconductor nanocrystal particle according to another embodiment.

In FIG. 1A and FIG. 1B, a is a length of the branch; b is a thickness of the valley portion (i.e., symmetrically grown shell). In the semiconductor nanocrystal particle, the depth (d) of at least one valley portion may be greater than 0. As used herein, the term "a depth of the valley portion" refers to a length extending from a straight line connecting two adjacent branches to the lowest point of the given valley portion (e.g., "d" in FIG. 1A and FIG. 1B)

As mentioned above, in the semiconductor nanocrystal according to an embodiment, the core and the shell may have the same crystal structure (e.g., zinc blend structure or wurtzeit structure) at the interface therebetween. The branch may have a different composition depending on the length, i.e. the composition of the branch may be a function of the length. The semiconductor nanocrystal according to an embodiment may have a shell thickness of greater than or equal to about 1 nm, for example, greater than about 1 nm, greater than or equal to about 1.1 nm, greater than or equal to about 1.3 nm, greater than or equal to about 1.4 nm, greater than or equal to about 1.5 nm, greater than or equal to about 1.6 nm, greater than or equal to about, or greater than or equal to about 1.7 nm.

The first semiconductor material may include a Group II-VI compound, a Group III-V compound, a Group IV-VI compound, a Group IV element or compound, a Group II-III-VI compound, or a combination thereof. The second semiconductor material may be different from the first semiconductor material, and may include a Group II-VI compound, a Group III-V compound, a Group IV-VI compound, a Group IV element or compound, a Group I-III-VI compound, a Group II-III-VI compound, a Group I-II-IV-IV compound, or a combination thereof.

The Group II-VI compound may be selected from:
a binary compound selected from ZnS, ZnSe, ZnTe, ZnO, HgS, HgSe, HgTe, MgSe, MgS, and a combination thereof;
a ternary compound selected from ZnSeS, ZnSeTe, ZnSTe, HgSeS, HgSeTe, HgSTe, HgZnS, HgZnSe, HgZnTe, MgZnSe, MgZnS, and a combination thereof; and
a quaternary compound selected from HgZnTeS, HgZnSeS, HgZnSeTe, HgZnSTe, and a combination thereof.

The Group III-V compound may be selected from:
a binary compound selected from GaN, GaP, GaAs, GaSb, AlN, AlP, AlAs, AlSb, InN, InP, InAs, InSb, and a combination thereof;
a ternary compound selected from GaNP, GaNAs, GaNSb, GaPAs, GaPSb, AlNP, AlNAs, AlNSb, AlPAs, AlPSb, InNP, InNAs, InNSb, InPAs, InPSb, and a combination thereof; and
a quaternary compound selected from GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The Group IV-VI compound may be selected from:
a binary compound selected from SnS, SnSe, SnTe, PbS, PbSe, PbTe, and a combination thereof;
a ternary compound selected from SnSeS, SnSeTe, SnSTe, PbSeS, PbSeTe, PbSTe, SnPbS, SnPbSe, SnPbTe, and a combination thereof; and
a quaternary compound selected from SnPbSSe, SnPbSeTe, SnPbSTe, and a combination thereof.

The Group I-III-VI compound may be selected from $CuInSe_2$, $CuInS_2$, CuInGaSe, and CuInGaS.

The Group II-III-VI compound may be selected from ZnGaS, ZnAlS, ZnInS, ZnGaSe, ZnAlSe, ZnInSe, ZnGaTe, ZnAlTe, ZnInTe, ZnGaO, ZnAlO, ZnInO, HgGaS, HgAlS, HgInS, HgGaSe, HgAlSe, HgInSe, HgGaTe, HgAlTe, HgInTe, MgGaS, MgAlS, MgInS, MgGaSe, MgAlSe, and MgInSe.

The Group I-II-IV-IV compound may be selected from CuZnSnSe and CuZnSnS.

The Group IV element or compound may be selected from:
a singular element material selected from Si, Ge, and a combination thereof; and
a binary element compound selected from SiC, SiGe, and a combination thereof.

The core may include a Group III-V compound (e.g., InP) and the shell may include a Group II-VI compound. The core may include indium, and the shell may include at least three elements (ternary element compound or quaternary element compound).

The core may further include Zn. For example, the core may be a Group III-V compound including Zn (e.g., InPZn or InP(Zn)). Herein, "InP(Zn)" refers to an InP nanocrystal having Zn on its surface.

The semiconductor nanocrystal having the above structure and the composition may be prepared according to a wet chemical method. Conditions for the wet chemical method can be selected appropriately. In the wet chemical method, the composition and shape of the core, the types and amount of for the shell precursors, and the order of the injection, the temperature, or the like are controlled to provide the aforementioned structure.

According to a non-limiting embodiment, in the shell growth after the core synthesis, a solution including shell precursors may be by step added to a reaction system to change the shell composition.

As a non-limiting example, when a 3-element (ABC) compound forms a shell, it is possible to control the inputting order of the A element precursor (e.g., metal element), the B element precursor (e.g., first non-metal element), and the C element precursor (e.g., second non-metal element) into a solution, the content, and the reaction time. For example, a core is added to the A element precursor solution, and then the B element precursor solution is added thereto, and the reaction proceeds for a predetermined time. Subsequently, at least one of the C element precursor solution and the B element precursor solution may be placed into the reaction system, either separately or in the form of a mixture, thus making the reaction to further proceed. At this time, by adjusting the inputting time of the C element precursor solution and the B element precursor solution and the ratio between the precursors in the reaction system, it becomes possible to control the lattice mismatch at the interface of the core and shell in the appropriate time point, and thereby the valley portion may grow together with the branch, so as to provide a semiconductor nanocrystal having the aforementioned structure.

At this time, by adjusting the inputting time of the C element precursor solution and the B element precursor solution and the ratio between the precursors in the reaction system, the lattice mismatch at the interface of the core and shell may be controlled at an appropriate time.

In addition, the reaction temperature and the types of the C element precursor may be changed to control the growing energy on the surface. Thereby, the valley portion may be grown together with the branch, and thus a semiconductor nanocrystal having the aforementioned structure may be obtained.

The reaction system may further include an organic solvent and an organic ligand, and the specific types thereof are not particularly limited. For example, the organic solvent may include a C6 to C22 primary alkylamine such as hexadecylamine, a C6 to C22 secondary alkylamine such as dioctylamine, a C6 to C40 tertiary alkylamine such as trioctylamine, nitrogen-containing heterocyclic compounds such as pyridine, a C6 to C40 olefin such as octadecene, a C6 to C40 aliphatic hydrocarbon such as hexadecane, octadecane, and squalene, a C6 to C30 alkyl group-substituted aromatic hydrocarbon such as phenyldodecane, phenyltetradecane, and phenyl hexadecane, a C6 to C22 alkyl group-substituted phosphine such as trioctylphosphine, a C6 to C22 alkyl group-substituted phosphine oxide such as trioctylphosphineoxide, a C12 to C22 aromatic ether such as phenyl ether, and benzyl ether, or a combination thereof.

The organic ligand may coordinate to the surface of the obtained nanocrystal, and therefore, may affect the light emitting and electric characteristics as well as may well disperse the nanocrystal in the solution phase. The ligand compound may be selected from RCOOH, $RNH_2$, $R_2NH$, $R_3N$, RSH, $R_3PO$, $R_3P$, ROH, RCOOR' and RCOOCOR' (wherein, R and R' are each independently a C1-C24 aliphatic hydrocarbon group, for example, an alkyl or alkenyl, or a C5-C24 aromatic hydrocarbon group, for example an aryl group). The ligand may be used alone or in a combination (such as a mixture) of two or more compounds.

Examples of the organic ligand compound may be methane thiol, ethane thiol, propane thiol, butane thiol, pentane thiol, hexane thiol, octane thiol, dodecane thiol, hexadecane thiol, octadecane thiol, benzyl thiol; methane amine, ethane amine, propane amine, butane amine, pentane amine, hexane amine, octane amine, dodecane amine, hexadecyl amine, oleyl amine, octadecyl amine, dimethyl amine, diethyl amine, dipropyl amine; methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, benzoic acid, palmitic acid, stearic acid; phosphine such as methyl phosphine, ethyl phosphine, propyl phosphine, butyl phosphine, pentyl phosphine, tributylphosphine, and trioctylphosphine; a phosphine compound or an oxide compound thereof such as methyl phosphine oxide, ethyl phosphine oxide, propyl phosphine oxide, butyl phosphine oxide, and trioctylphosphine oxide; diphenyl phosphine, triphenyl phosphine compound or an oxide compound thereof; phosphonic acid, and the like, but is not limited thereto. The organic ligand compound may be used alone or in a mixture of two or more compounds.

The reaction conditions such as a reaction temperature and a time are not particularly limited, and may be selected appropriately. In non-limiting embodiments, the solvent and, optionally, the ligand compound is heated (or subjected to a vacuum-treatment) at a predetermined temperature (e.g., at a temperature of greater than or equal to about 100° C.) under vacuum and heated again at a predetermined temperature (e.g., at a temperature of greater than or equal to 100° C.) after purging the inert gas to provide the inert gas atmosphere. Subsequently, the core is input, and the shell precursor is sequentially or simultaneously input and reacted by heating at a predetermined reaction temperature. The shell precursor may be sequentially input for a reaction time as a mixture having the different ratio.

A precursor including a metal element (which is free of cadmium) includes a Group II metal, a Group III metal, or a Group IV metal, and may be a metal powder, an alkylated metal compound, a metal alkoxide, a metal carboxylate, a metal nitrate, a metal perchlorate, a metal sulfate, a metal acetylacetonate, a metal halide, a metal cyanide, a metal hydroxide, a metal oxide, a metal peroxide, or a combination thereof.

Examples of the precursor including a metal element may include one or more selected from dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bisacetylacetonate, tin bromide, tin chloride, tin fluoride, tin oxide, tin sulfate, germanium tetrachloride, trimethyl indium, indium acetate, indium hydroxide, indium chloride, indium oxide, indium nitrate, indium sulfate, thallium acetate, thallium acetylacetonate, thallium chloride, thallium oxide, thallium ethoxide, thallium nitrate, thallium sulfate, thallium carbonate, dimethyl magnesium, dibutyl magnesium, magnesium ethoxide, magnesium acetylacetonate, magnesium carboxylate, and magnesium halide, but are not limited thereto.

A precursor including a non-metal element may include one or more selected from hexane thiol, octane thiol, decane thiol, dodecane thiol, hexadecane thiol, mercapto propyl silane, sulfur-trioctylphosphine (S-TOP), sulfur-tributylphosphine (S-TBP), sulfur-triphenylphosphine (S-TPP), sulfur-trioctylamine (S-TOA), bistrimethylsilyl sulfur, sulfide ammonium, sodium sulfide, tellurium-tributylphosphine (Te-TBP), tellurium-triphenylphosphine (Te-TPP), tris(trimethylsilyl)phosphine, tris(dimethylamino)phosphine, triethylphosphine, tributylphosphine, trioctylphosphine, triphenylphosphine, tricyclohexylphosphine, arsenic oxide, arsenic chloride, arsenic sulfate, arsenic bromide, arsenic iodide, tris(trimethylsilyl)arsenic, nitric oxide, nitric acid, and ammonium nitrate, but are not limited thereto.

After completing the reaction, when a non-solvent is added to the reaction product, the nanocrystal coordinated to the ligand compound may be separated. The non-solvent may be a polar solvent which can be mixed with the solvent used in the reaction, but which is not capable of dispersing the nanocrystal. The non-solvent may be selected in accordance with a solvent used in the reaction, and may be, for example, acetone, ethanol, butanol, isopropanol, ethanediol, water, tetrahydrofuran (THF), dimethylsulfoxide (DMSO), diethyl ether, formaldehyde, acetaldehyde, ethylene glycol, a solvent having a similar solubility parameter to the foregoing solvents, or a combination thereof. The separation may be accomplished by a centrifuge, a precipitation, a chromatography, or a distillation. The separated nanocrystal may be added in the solvent to be purified, if desired. The solvent is not particularly limited and may be a solvent having a solubility parameter similar to the solubility parameter of the ligand. The examples of the solvent may include hexane, heptane, octane, chloroform, toluene, benzene or the like.

Although the semiconductor nanocrystal particle including the structure includes no cadmium, it may have a high level of quantum efficiency. The semiconductor nanocrystal particles having the aforementioned structure may find their utilities in various fields, such as a light emitting diode (LED), a solar cell, a bio sensor, an image sensor, and the like.

Another embodiment provides an electronic device including the semiconductor nanocrystal particle. Details of the semiconductor nanocrystal particle are the same as described above. The electronic device may be a light emitting diode (LED), an organic light emitting diode (OLED), a sensor, an imaging sensor, or a solar cell electronic device, or a liquid crystal display (LCD) device, but is not limited thereto.

Hereinafter, the exemplary embodiments are illustrated in more detail with reference to specific examples. However, they are exemplary embodiments of the present disclosure, and the disclosure is not limited thereto.

EXAMPLES

Analysis Method

[1] Analysis of Photoluminescence (e.g., Quantum Efficiency)

Using a Hitachi F-7000 spectrometer, a photoluminescence (PL) spectrum of the prepared nanocrystals at an irradiation wavelength of 458 nanometers (nm) for the green QD or at an irradiation wavelength of 532 nm (for the red QD) is obtained.

[2] UV Spectroscopy Analysis

Using a Hitachi U-3310 spectrometer, a UV spectroscopy analysis is performed to provide a UV-Visible absorption spectrum.

[3] TEM Analysis and EDX Analysis

Using UT F30 Tecnai electron microscope, a transmission electron microscope image of the obtained nanocrystal is obtained.

EDX analysis is performed using a Osiris 200 kV TEM (FEI)-4 EDS detectors (Bruker).

[4] ICP Analysis

Using Shimadzu ICPS-8100, an inductively coupled plasma atom light emitting spectroscopy analysis (ICP-AES) is performed.

[5] HAADF STEM Analysis

Using Titan ChemiSTEM 200 kV (FEI), a HAADF STEM analysis is performed.

Figure 2:
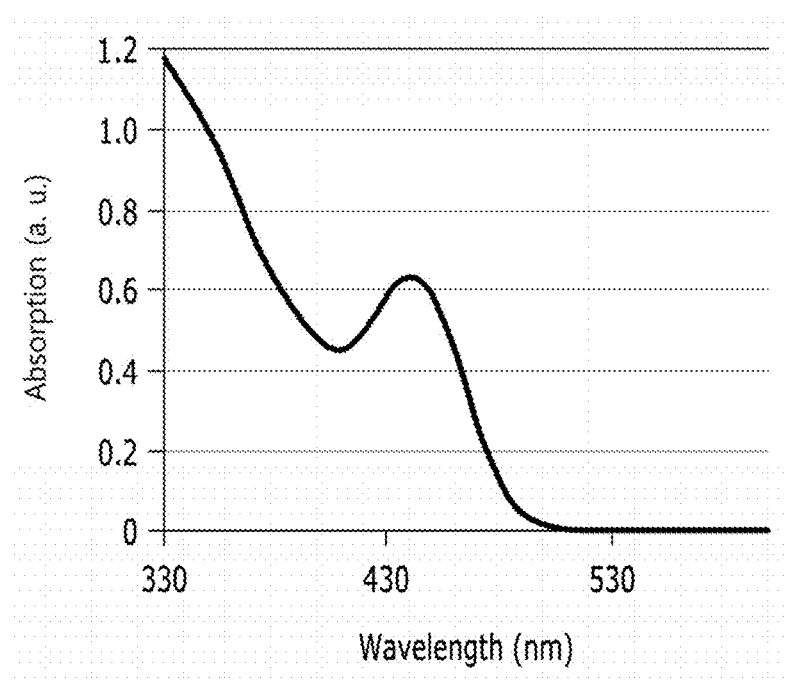
FIG. 2 is a graph of absorption (arbitrary units, a. u.) versus wavelength (nanometers, nm) showing a UV absorption spectrum of a semiconductor nanocrystal core obtained according to Reference Example.

Reference Example 1: Preparation of InZnP Core 0.2 millimoles (mmol) of indium acetate, 0.125 mmol of zinc acetate, 0.6 mmol of palmitic acid, 10 milliliters (mL) of 1-octadecene are input into a reactor and heated at 120° C. under vacuum. After one hour, the reactor is filled out with nitrogen. After heating to 280° C., a mixed solution of 0.15 mmol of tris(trimethylsilyl)phosphine (TMS$_3$P) and 1 mL of trioctylphosphine is rapidly injected and reacted for 20 minutes. After rapidly cooling the reaction solution to room temperature, the reaction solution is diluted with acetone, centrifuged to provide a precipitate, and the precipitate is dispersed in toluene. FIG. 2 shows UV spectrum of the obtained InP semiconductor nanocrystal. The nanocrystal is determined to have a UV first absorption maximum wavelength of 440 nm and a core diameter of 2.16 nm.

Example 1: Core-Shell Semiconductor Nanocrystal Having InZnP/ZnSeS Branch 1.8 mmol (0.336 g) of zinc acetate, 3.6 mmol (1.134 g) of oleic acid, and 10 mL of trioctylamine are input into a flask and vacuumed at 120° C. for 10 minutes. The inside of flask is substituted with nitrogen (N$_2$) and heated at 180° C. InZnP core obtained from Reference Example 1 is input thereto within 10 seconds. Subsequently, 0.04 mmol of Se/TOP is slowly injected, and the mixture is heated at 280° C. Then 0.01 mmol of S/TOP is input thereto, the mixture is heated at 320° C., and reacted for 10 minutes. Continuously, a mixed solution of 0.02 mmol of Se/TOP and 0.04 mmol of S/TOP is slowly injected, and the mixture is reacted again for 20 minutes. Then, the step of injecting Se and S with changing the mixing ratio thereof and reacting the same for 20 minutes is repeated. At this time, as a mixed solution of Se and S, a mixed solution of 0.01 mmol Se/TOP+0.05 mmol S/TOP, a mixed solution of 0.005 mmol Se/TOP+0.1 mmol S/TOP, and a mixed solution of 0.5 mmol S/TOP are used sequentially.

After completing all the reaction, the reactor is cooled, and the obtained nanocrystal is centrifuged with ethanol and dispersed in toluene. The obtained nanocrystal (QD) has a UV first absorption maximum of 500-515 nm, a PL emission peak of 520-545 nm, FWHM of 38-44 nm, QY of 80-99%.

Figure 3A:
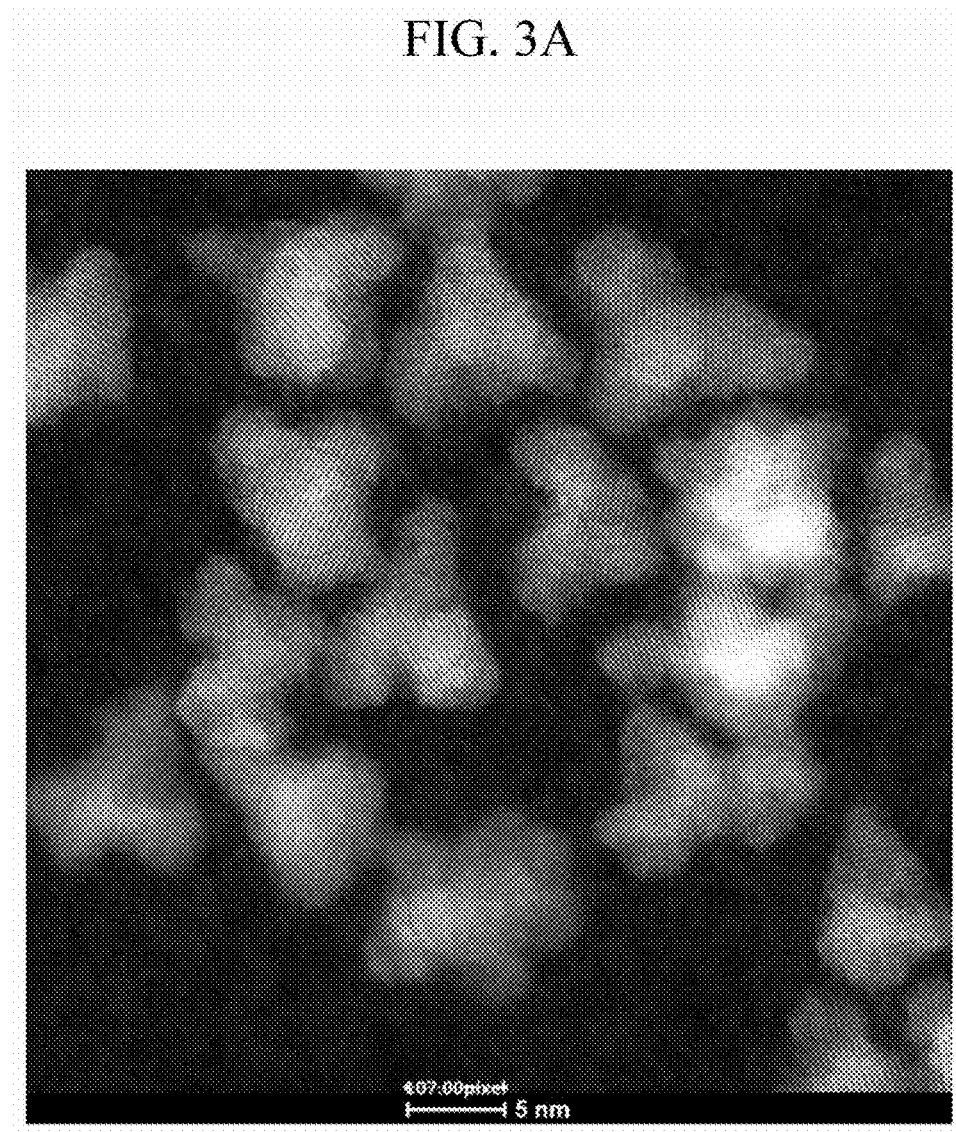
FIG. 3A is a transmission electron microscope image of a semiconductor nanocrystal particle obtained according to Example 1.
Figure 3B:
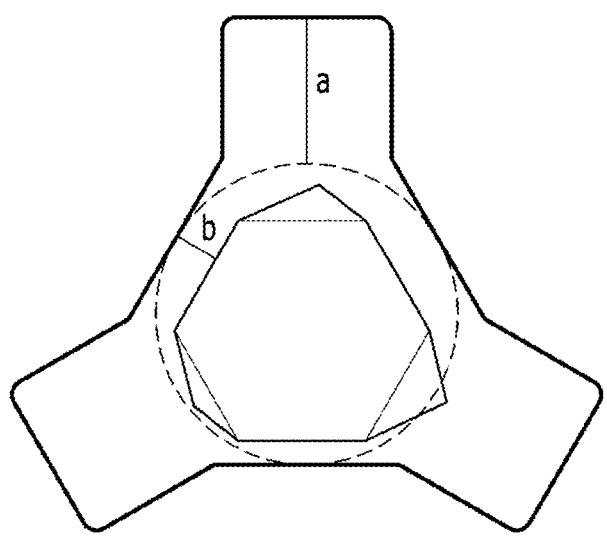
FIG. 3B is a schematic view showing a shape of a semiconductor nanocrystal particle obtained according to Example 1.

FIG. 3A shows a transmission electron microscope image of the obtained semiconductor nanocrystal. FIG. 3B is schematic view showing a particle shape of the obtained semiconductor nanocrystal.

The obtained semiconductor nanocrystal has a size as follows:

core diameter=2.16 nm;

core-shell diameter=5.39 nm;

valley portion thickness (b)=1.61 nm; and branch length (a)=2.57 nm.

The results show that the semiconductor nanocrystal particle is synthesized to include at least two branches (for example, three) and a valley portion connecting branches, and to have a depth of the valley portion of greater than 0.

Figure 5A:
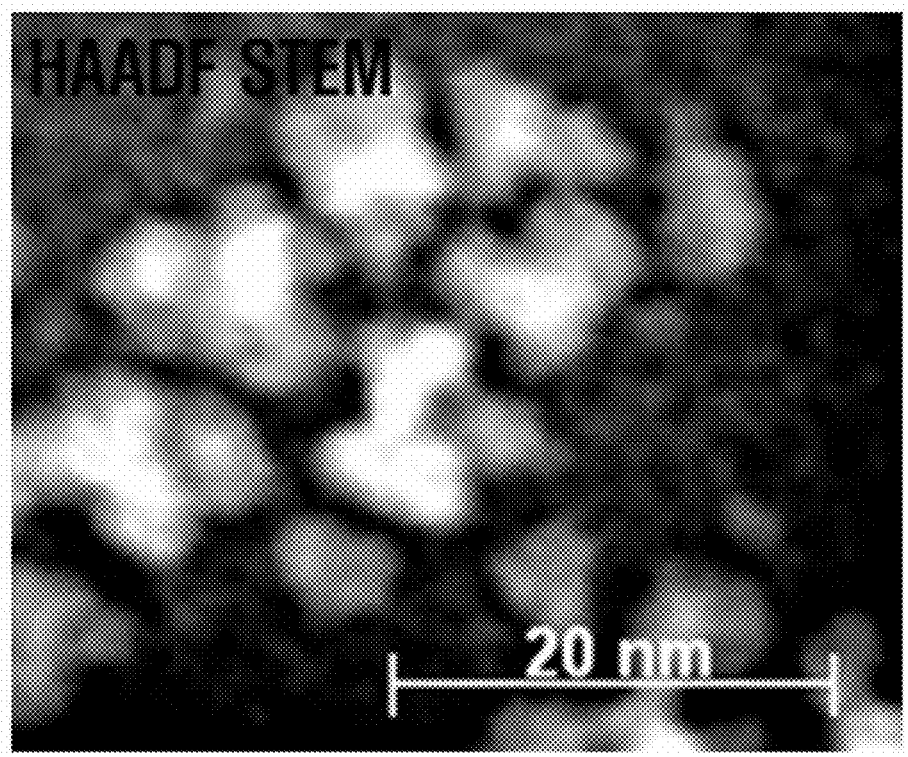
FIG. 5A shows a High-Angle Annular Dark-Field Scanning Transmission Electron Microscopy (HAADF-STEM) image of a semiconductor nanocrystal particle obtained according to Example 1.
Figure 5B:
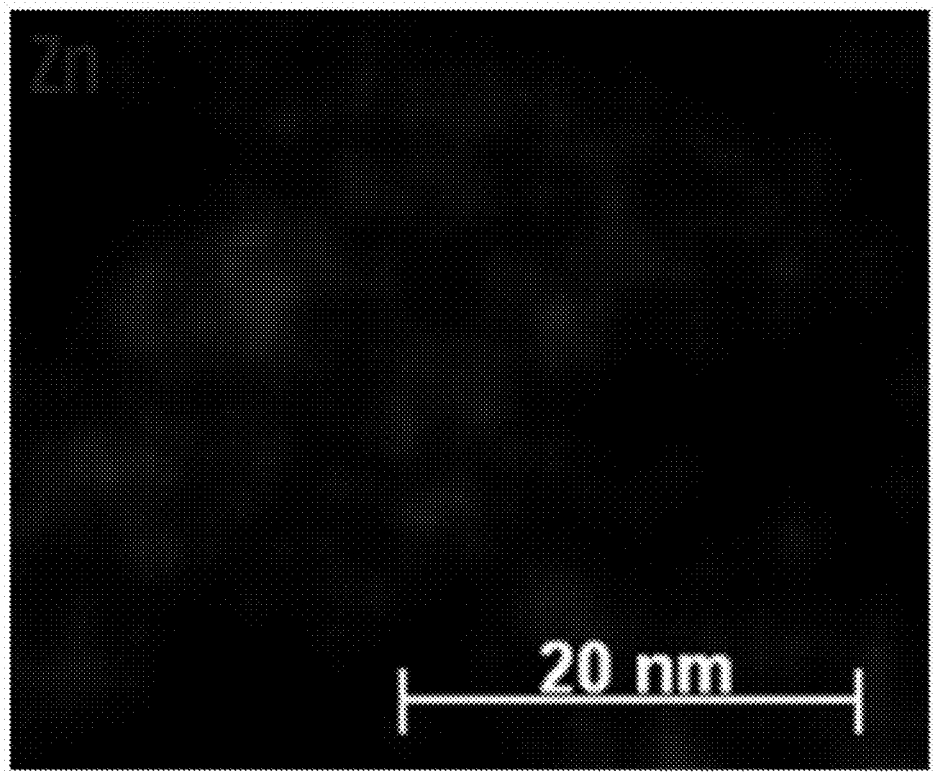
FIG. 5B shows a part of EDX analysis results (Zn atomic mapping) of a semiconductor nanocrystal particle obtained according to Example 1.
Figure 5C:
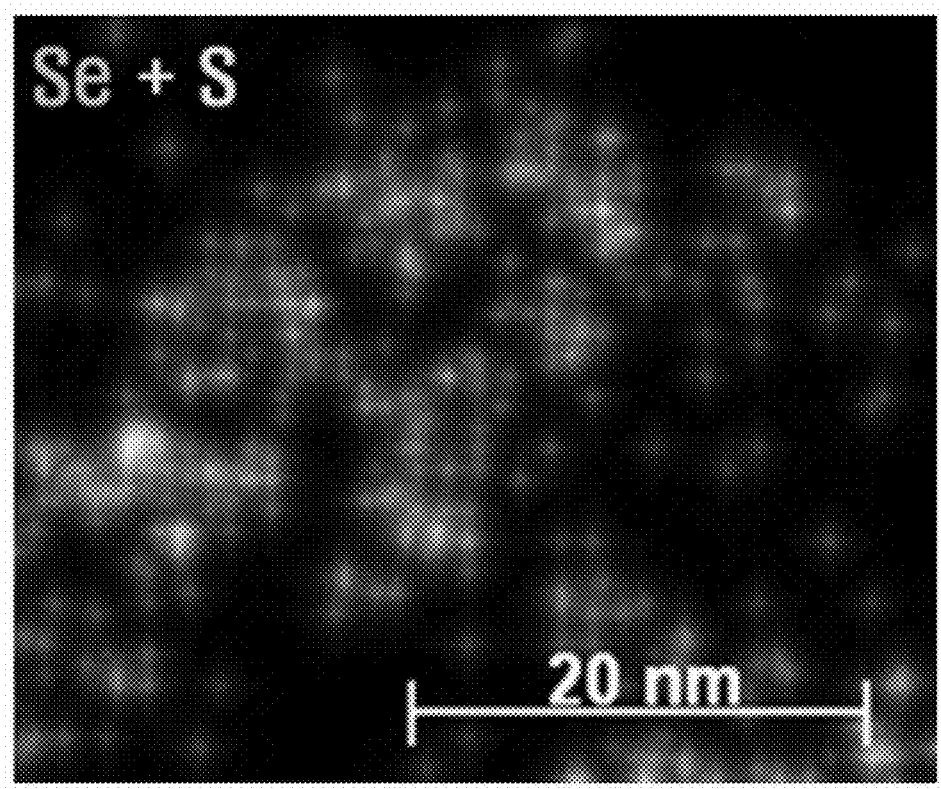
FIG. 5C is a part of EDX analysis result (Se atomic and S atomic mapping) of a semiconductor nanocrystal particle obtained according to Example 1.

For the obtained semiconductor nanocrystal particle, a HAADF STEM analysis is performed, and the results are shown in FIG. 5A, FIG. 5B and FIG. 5C. The results of FIG. 5A, FIG. 5B and FIG. 5C show that the obtained semiconductor nanocrystals have a core-shell structure including a shell including at least two (e.g., three) branches and a valley portion connecting the branches.

It is also confirmed that ZnS content increases toward the end of the branch (i.e., the composition is changed along with the length of the branch). It is determined that the obtained semiconductor nanocrystal particle has a quantum efficiency of 95%.

Comparative Example 1: InZnP/ZnSeS (Branchless) Core-Shell Semiconductor Nanocrystal Semiconductor nanocrystal particles are synthesized in accordance with the same procedure as in Example 1, except that the injecting amount of the mixed solution is changed as described in the procedure below:

After the 10 minute reaction at 320° C., a mixed solution of 0.02 mmol Se/TOP and 0.04 mmol S/TOP is added slowly and reacted again for 20 minutes. Then a mixed solution of 0.01 mmol Se/TOP+0.05 mmol S/TOP is injected and reacted for 20 minutes to complete the reaction.

Figure 4A:
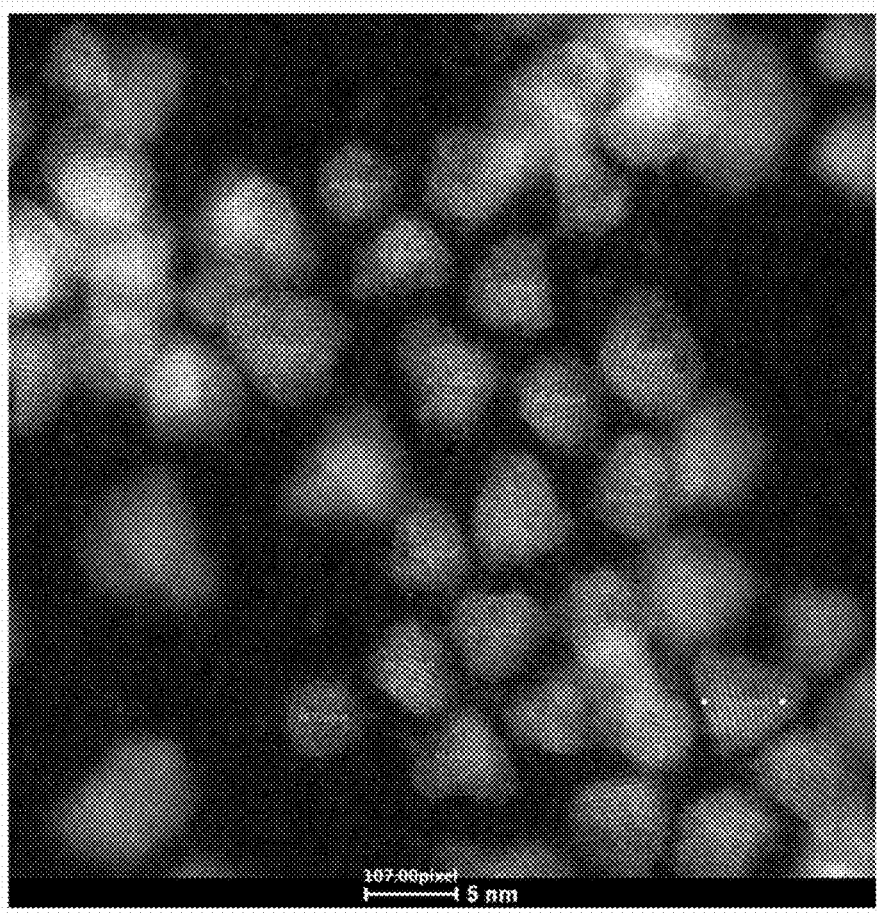
FIG. 4A is a transmission electron microscope image of a semiconductor nanocrystal particle obtained according to Comparative Example 1.
Figure 4B:
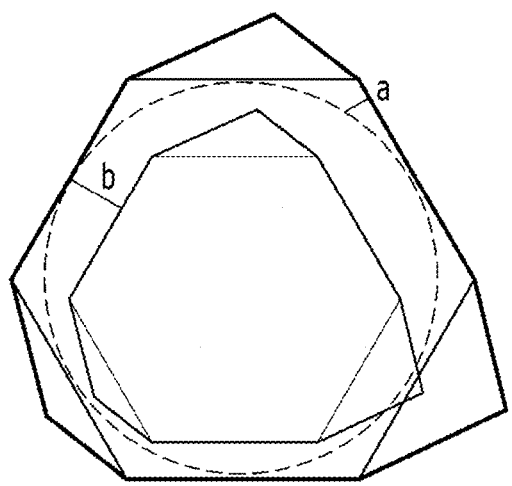
FIG. 4B is a schematic view showing a shape of a semiconductor nanocrystal particle obtained according to Comparative Example 1.

FIG. 4A shows a transmission electron microscope image of the obtained semiconductor nanocrystals. FIG. 4B is a schematic view showing a particle shape of the obtained semiconductor nanocrystals.

The obtained semiconductor nanocrystal has a size as follows:

core diameter=2.16 nm;

core-shell diameter=4.16 nm; and shell thickness (b)=1 nm.

The results show that the obtained semiconductor nanocrystal particles have a structure in which the branch is not developed. The obtained semiconductor nanocrystal particles have a quantum efficiency of 70%, which is significantly lower than in Example.

Example 2

Figure 6:
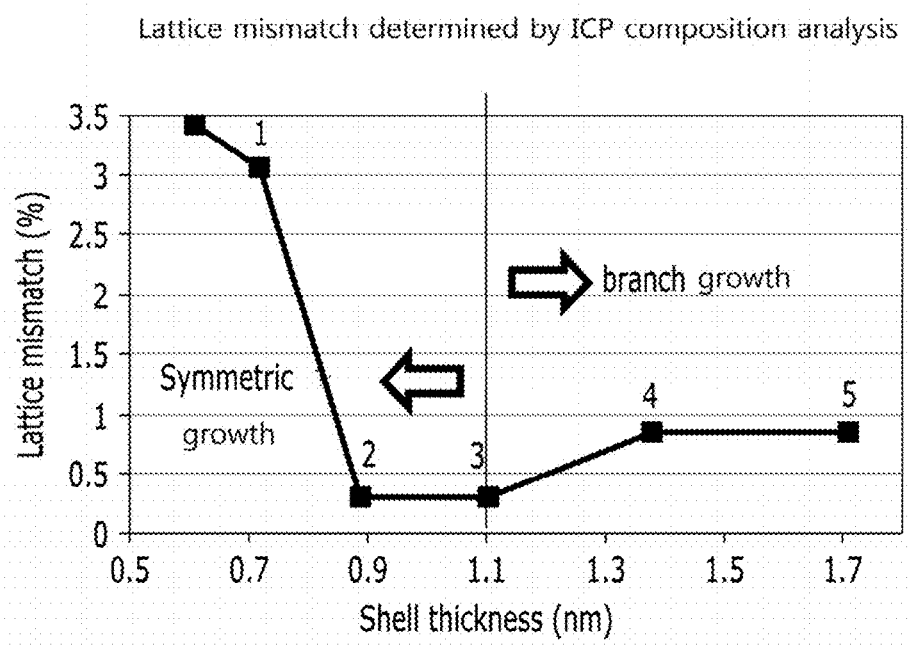
FIG. 6 is a graph of lattice mismatch (percent. %) versus shell thickness (nanometers, nm) showing the mismatch between the lattice of a InP core and a ZnSeS shell by analyzing the ICP composition in the different shell thickness according to Example 2.

Semiconductor nanocrystals having at least two branches and a valley portion are synthesized by repeating the same procedure as in Example 1. In this example, certain amount of the sample is taken during the shell growing process, and the sample is subjected to an ICP composition analysis and a transmission electron microscope analysis in order to measure the lattice mismatch and the size thereof. The results thereof are shown in FIG. 6 and the following Table 1 and Table 2.

TABLE 1

| | Sample No. | | | | |
|---|---|---|---|---|---|
| | 1 | 2 | 3 | 4 | 5 |
| Thickness (nm) | 0.72 | 0.89 | 1.10 | 1.38 | 1.71 |
| QY (%) | 55 | 55 | 71 | 85 | 95 |
| $\lambda_{max}$ (nm) | 530 | 529 | 527 | 527 | 529 |
| FWHM (nm) | 56 | 43 | 40 | 39 | 40 |

TABLE 2

| | Sample No. | | |
|---|---|---|---|
| | 3 | 4 | 5 |
| Core diameter (nm) | 2.16 | 2.16 | 2.16 |
| Core-shell diameter (nm) | 4.16 | 4.87 | 5.39 |
| Symmetric shell thickness (valley portion thickness): b (nm) | 1 | 1.36 | 1.61 |
| Branch length: a (nm) | 0.64 | 1.91 | 2.57 |

The results show that the lattice mismatch at the interface between the InZnP core and the ZnSeS shell is about 3.5%, and once the shell thickness is greater than 1 nm, the lattice mismatch degree increases again to provide a structure in which the branch is developed. In this example, with the development of the branch structure, the quantum efficiency significantly increases without any substantial changes in a full width at half maximum (FWHM). As the branch stricture is developed (a), the thickness of the valley portion (b) increases together and it passivates the core, and the efficiency thereof may increase.

Example 3

Figure 7:
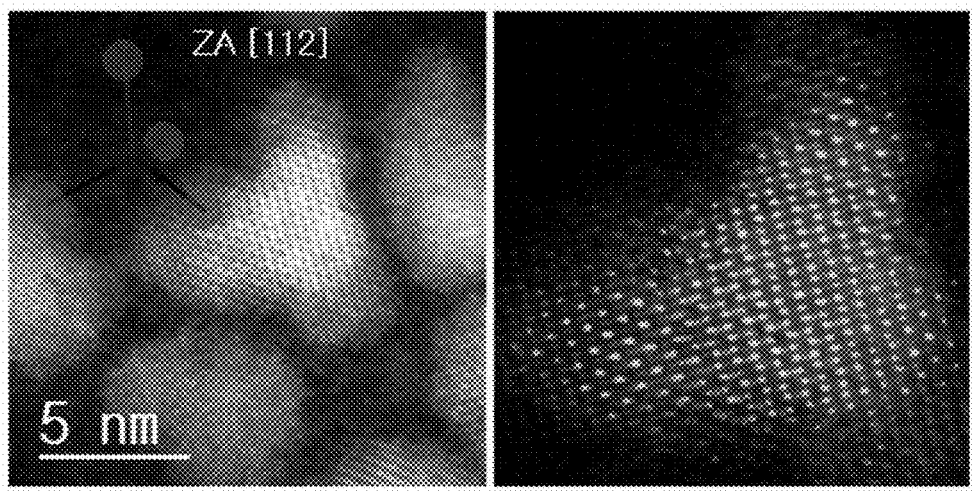
FIG. 7 is a transmission electron microscope image of a semiconductor nanocrystal particle obtained according to Example 3.

Semiconductor nanocrystal particles are synthesized in accordance with the same procedure as in Example 1, except that the injecting amount of mixed solution is changed as below, and the transmission electron microscope image thereof is shown in FIG. 7.

After the 10 minute reaction at 320° C., a mixed solution of 0.02 mmol Se/TOP and 0.04 mmol S/TOP is slowly injected thereto, and then reacted for another 20 minutes. Then, the step of injecting Se and S with a changed mixing ratio thereof and reacting the same for 20 minutes is repeated. As a mixed solution of Se and S, a mixed solution of 0.01 mmol Se/TOP+0.1 mmol S/TOP, a solution of 0.2 mmol S/TOP, and a solution of 0.5 mmol S/TOP are used in this order.

FIG. 7 confirms that a concave valley portion connects the branches. During its growth, the shell forms at the concave valley portion to provide an octopod semiconductor nanocrystal. The obtained semiconductor nanocrystals show a quantum efficiency of greater than or equal to about 80%.

Example 4

Figure 8A:
FIG. 8A is a transmission electron microscope image of a semiconductor nanocrystal particle obtained according to Example 4.

Semiconductor nanocrystal particles are synthesized in accordance with the same procedure as in Example 1, except that the injecting amount of the mixed solution for forming a shell is increased, and the reaction concentration is increased as below, and the transmission electron microscope image thereof is shown in FIG. 8A.

After the 10 minute reaction at 320° C., a mixed solution of 0.04 mmol Se/TOP and 0.08 mmol S/TOP is slowly injected, and a reaction proceeds for another 20 minutes.

Then, the step of injecting Se and S with a changed mixing ratio thereof and reacting the same for 20 minutes is repeated. As a mixed solution of Se and S, a mixed solution of 0.02 mmol Se/TOP+0.1 mmol S/TOP, a mixed solution of 0.02 mmol Se/TOP+0.15 mmol S/TOP, a mixed solution of 0.01 mmol Se/TOP+0.2 mmol S/TOP, a mixed solution of 0.01 mmol Se/TOP+0.25 mmol S/TOP, a solution of 0.3 mmol S/TOP, and a solution of 0.6 mmol S/TOP are used in this order.

Figure 8B:
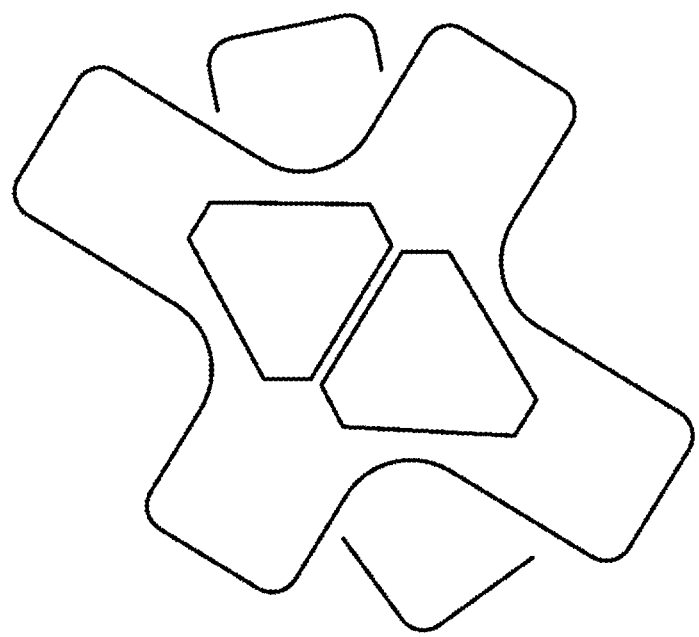
FIG. 8B is a schematic view showing a shape of a semiconductor nanocrystal particle obtained according to Example 4.

FIG. 8B is a schematic view showing a particle shape of the obtained semiconductor nanocrystal. As shown in FIG. 8A, the shell coating is performed in a state in which the core faces are attached to each other in the truncated tetrahedron structure. In this case, it has a multipod shape, and the number of branches is neither 4 nor 8. In the obtained shell, it is determined that the concave valley portion connects the faces between the branches, and the obtained semiconductor nanocrystal particle has a quantum efficiency of greater than or equal to about 80%.

Example 5

Figure 9A:
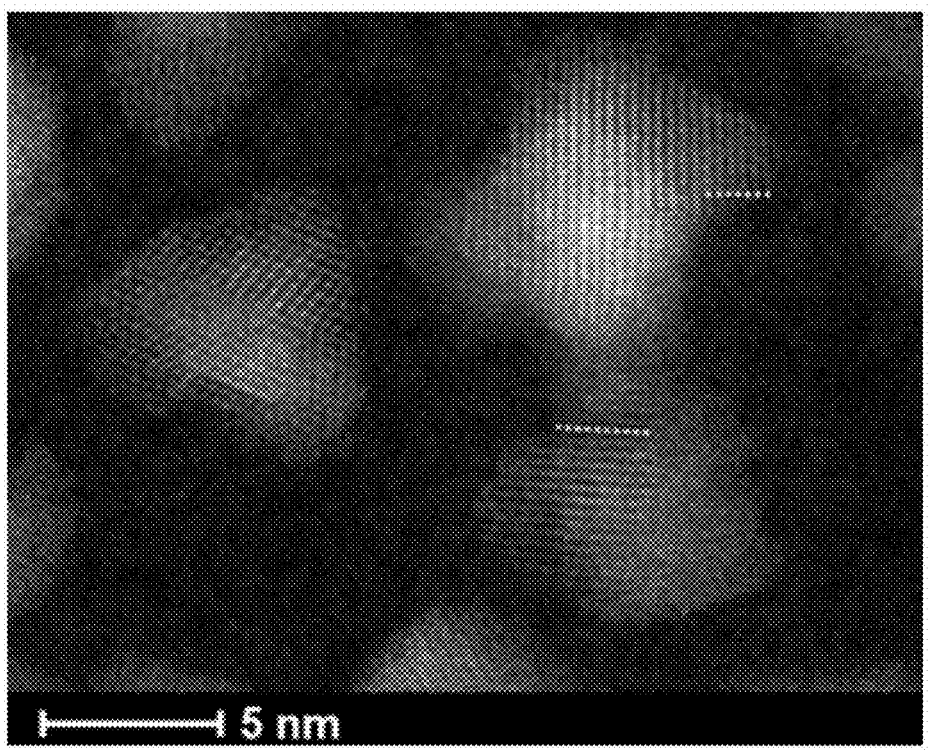
FIG. 9A is a transmission electron microscope image of a semiconductor nanocrystal particle obtained according to Example 5.

Semiconductor nanocrystal particles are synthesized in accordance with the same procedure as in Example 1, except that the types of precursors and the reaction temperature are changed as below, and the transmission electron microscope image thereof is shown in FIG. 9A.

After the 10 minute reaction at 320° C., a mixed solution of 0.02 mmol Se/TOP and 0.04 mmol S/TOP is injected slowly, and a reaction proceeds at 330° C. for another 20 minutes. Then, the step of injecting Se and S with a changed mixing ratio thereof and reacting the same for 20 minutes is repeated. As a mixed solution of Se and S, a mixed solution of 0.01 mmol Se/TOP+0.05 mmol S/TOP, a mixed solution of 0.005 mmol Se/TOP+0.1 mmol S/TOP, and a solution of 0.5 mmol S/ODE are used in this order.

Figure 9B:
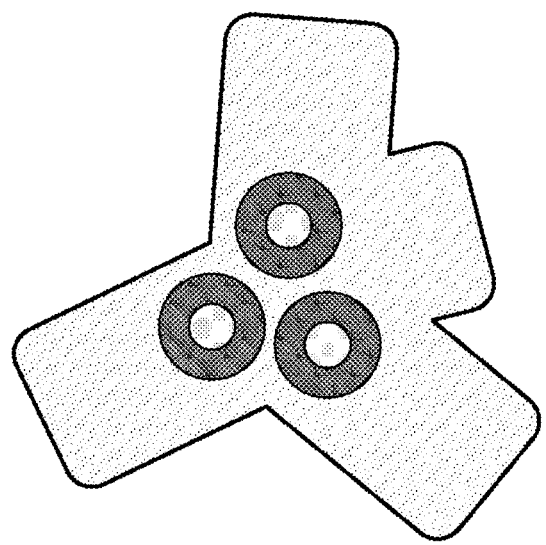
FIG. 9B is a schematic view showing a shape of semiconductor nanocrystal particle obtained according to Example 5.

FIG. 9B is a schematic view showing a particle shape of the obtained semiconductor nanocrystal. As shown in FIG. 9A, it is confirmed that it has a similar structure to that of Example 3, but the shell is grown at a state wherein a plurality of the cores is not attached. In the initial stage of the shell growth, the core may be irregularly coated, and thus the core-shell may attach with each other. The shell developed in a direction of the high surface energy of the second core may cover the surface of the low surface energy of the first core. It is determined that the obtained semiconductor nanocrystal may have a quantum efficiency of greater than or equal to about 80%.

While this disclosure has been described in connection with what is presently considered to be practical exemplary embodiments, it is to be understood that the disclosure is not limited to the present embodiments, but, on the contrary, is intended to cover various modifications and equivalent arrangements included within the spirit and scope of the appended claims.

What is claimed is:

1. A semiconductor nanocrystal particle comprising:
a core comprising a first semiconductor material comprising indium and zinc; and
a shell disposed on the core,
wherein the shell comprises a second semiconductor material different from the first semiconductor material,
wherein the semiconductor nanocrystal particle is free of cadmium,
wherein the shell comprises at least two branches that radially protrude from an outer surface of the shell, and at least one valley portion that connects the at least two branches via their lower portions,
wherein a thickness from a top of the at least two branches to a surface of the core is greater than a thickness from a highest point of an outer surface of the at least one valley portion to the surface of the core.

2. The semiconductor nanocrystal particle of claim 1, wherein the shell surrounds the entire surface of the core.

3. The semiconductor nanocrystal particle of claim 1, wherein the shell comprises at least three branches.

4. The semiconductor nanocrystal particle of claim 1, wherein in the semiconductor nanocrystal particle, a depth of the at least one valley portion is greater than about 0, wherein the depth of the at least one valley portion means a length extending from a straight line connecting the lower portions of the at least two branches through which they are connected by the at least one valley portion to a lowest point of the outer surface of the at least one valley portion.

5. The semiconductor nanocrystal particle of claim 1, wherein a composition of the branch is a function of its length.

6. The semiconductor nanocrystal particle of claim 1, wherein the core and the shell have the same crystal structure at the interface therebetween.

7. The semiconductor nanocrystal particle of claim 6, wherein the crystal structure is a zinc blend or wurtzeit.

8. The semiconductor nanocrystal particle of claim 1, wherein the second semiconductor material comprises a Group II-VI compound, a Group III-V compound, a Group IV-VI compound, a Group IV element or compound, a Group I-III-VI compound, a Group II-III-VI compound, a Group I-II-IV-IV compound, or a combination thereof.

9. The semiconductor nanocrystal particle of claim 8, wherein the Group II-VI compound of the second semiconductor material is selected from: a binary compound selected from ZnS, ZnSe, ZnTe, ZnO, HgS, HgSe, HgTe, MgSe, MgS, and a combination thereof;
a ternary compound selected from ZnSeS, ZnSeTe, ZnSTe, HgSeS, HgSeTe, HgSTe, HgZnS, HgZnSe, HgZnTe, MgZnSe, MgZnS, and a combination thereof; and
a quaternary compound selected from HgZnTeS, HgZnSeS, HgZnSeTe, HgZnSTe, and a combination thereof,
the Group III-V compound of the second semiconductor material is selected from:
a binary compound selected from GaN, GaP, GaAs, GaSb, AlN, AlP, AlAs, AlSb, InN, InP, InAs, InSb, and a combination thereof;
a ternary compound selected from GaNP, GaNAs, GaNSb, GaPAs, GaPSb, AlNP, AlNAs, AlNSb, AlPAs, AlPSb, InNP, InNAs, InNSb, InPAs, InPSb, and a combination thereof; and
a quaternary compound selected from GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof,
the Group IV-VI compound of the second semiconductor material is selected from:
a binary compound selected from SnS, SnSe, SnTe, PbS, PbSe, PbTe, and a combination thereof;
a ternary compound selected from SnSeS, SnSeTe, SnSTe, PbSeS, PbSeTe, PbSTe, SnPbS, SnPbSe, SnPbTe, and a combination thereof; and a quaternary compound selected from SnPbSSe, SnPbSeTe, SnPbSTe, and a combination thereof, the Group I-III-VI compound of the second semiconductor material is selected from CuInSe$_2$, CuInS$_2$, CuInGaSe, and CuInGaS, the Group II-III-VI compound of the second semiconductor material is selected from ZnGaS, ZnAlS, ZnInS, ZnGaSe, ZnAlSe, ZnInSe, ZnGaTe, ZnAlTe, ZnInTe, ZnGaO, ZnAlO, ZnInO, HgGaS, HgAlS, HgInS, HgGaSe, HgAlSe, HgInSe, HgGaTe, HgAlTe, HgInTe, MgGaS, MgAlS, MgInS, MgGaSe, MgAlSe, and MgInSe, the Group I-II-IV-IV compound of the second semiconductor material is selected from CuZnSnSe and CuZnSnS, and the Group IV element or compound of the second semiconductor material is selected from:

a singular element material selected from Si, Ge, and a combination thereof; and a binary compound selected from SiC, SiGe, and a combination thereof.

10. The semiconductor nanocrystal particle of claim 8, wherein the shell comprises a Group II-VI compound.

11. The semiconductor nanocrystal particle of claim 10, wherein the shell comprises at least three elements.

12. The semiconductor nanocrystal particle of claim 1, wherein the semiconductor nanocrystal particle has quantum efficiency of greater than or equal to about 75%.

13. An electronic device comprising the semiconductor nanocrystal particle of claim 1.

14. The semiconductor nanocrystal particle of claim 1, wherein at least one concave valley portion has a concave surface between the at least two branches.

15. The semiconductor nanocrystal particle of claim 1, wherein a thickness of the shell is greater than or equal to about 1 nanometer.

* * * * *